US010793675B2

(12) United States Patent
Guggenheim et al.

(10) Patent No.: US 10,793,675 B2
(45) Date of Patent: Oct. 6, 2020

(54) METHOD OF MAKING POLYETHERIMIDE

(71) Applicant: SABIC GLOBAL TECHNOLOGIES B.V., Bergen op Zoom (NL)

(72) Inventors: Thomas Link Guggenheim, Mount Vernon, IN (US); Nitin Vilas Tople, Evansville, IN (US); Karthik Venkataraman, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 32 days.

(21) Appl. No.: 16/302,428

(22) PCT Filed: May 23, 2017

(86) PCT No.: PCT/US2017/033937
§ 371 (c)(1),
(2) Date: Nov. 16, 2018

(87) PCT Pub. No.: WO2017/205335
PCT Pub. Date: Nov. 30, 2017

(65) Prior Publication Data
US 2019/0292318 A1    Sep. 26, 2019

Related U.S. Application Data

(60) Provisional application No. 62/340,831, filed on May 24, 2016.

(51) Int. Cl.
*C08G 73/00* (2006.01)
*C08G 73/10* (2006.01)

(52) U.S. Cl.
CPC ..... *C08G 73/1032* (2013.01); *C08G 73/1017* (2013.01); *C08G 73/1028* (2013.01); *C08G 73/1046* (2013.01); *C08G 73/1053* (2013.01); *C08G 73/1078* (2013.01)

(58) Field of Classification Search
USPC ......................................................... 528/207
See application file for complete search history.

(56) References Cited

U.S. PATENT DOCUMENTS

| | | |
|---|---|---|
| 3,803,085 A | 4/1974 | Takehoshi et al. |
| 3,833,546 A | 9/1974 | Takekoshi et al. |
| 3,847,867 A | 11/1974 | Heath et al. |
| 3,917,643 A | 11/1975 | Takekoshi et al. |
| 3,991,004 A | 11/1976 | Takekoshi et al. |
| 4,011,198 A | 3/1977 | Takekoshi et al. |
| 4,073,773 A | 2/1978 | Banucci et al. |
| 4,293,683 A | 10/1981 | Takekoshi et al. |
| 4,417,044 A | 11/1983 | Parekh |
| 4,443,591 A | 4/1984 | Schmidt et al. |
| 4,443,592 A | 4/1984 | Schmidt et al. |
| 4,511,535 A | 4/1985 | Schmidt et al. |
| 4,585,852 A | 4/1986 | Lo et al. |
| 4,835,249 A | 5/1989 | Gallagher et al. |
| 5,189,137 A | 2/1993 | Howson et al. |
| 6,713,597 B2 | 3/2004 | Lindway |
| 6,924,350 B2 | 8/2005 | Dong et al. |
| 6,949,622 B2 | 9/2005 | Silvi et al. |
| 7,053,168 B2 | 5/2006 | Silvi et al. |
| 7,122,619 B2 | 10/2006 | Silvi et al. |
| 7,411,032 B2 | 8/2008 | Stella et al. |
| 2005/0049394 A1* | 3/2005 | Dong ..................... C08G 65/46 528/481 |
| 2006/0270825 A1* | 11/2006 | Angermeier ........... C08G 69/04 528/310 |
| 2008/0262196 A1 | 10/2008 | Giammattei et al. |
| 2009/0029615 A1 | 1/2009 | Susarla et al. |
| 2010/0160578 A1 | 6/2010 | Odle et al. |

OTHER PUBLICATIONS

US 4,421,907 A, 12/1983, Schmidt et al. (withdrawn)
Bettina Baumgartner et al: "Towards a genreal understanding of hydrothermal polymerization of polyimidies", Polymer Chemistry, vol. 6, No. 31, May 20, 2015, pp. 5773-5781.
International Search Rerport for International Application No. PCT/US2017/033937, International Filing date May 23, 2017, dated Aug. 24, 2017, 5 pages.
Written Opinion for International Application No. PCT/US2017/033937, International Filing date May 23, 2017, dated Aug. 24, 2017, 8 pages.

* cited by examiner

*Primary Examiner* — Terressa Boykin
(74) *Attorney, Agent, or Firm* — Cantor Colburn LLP

(57) ABSTRACT

A method of making a polyetherimide comprises: combining a bisphenol A dianhydride, p-phenylene diamine and a halogenated aromatic solvent to form a reactant solution; heating the reactant solution to a temperature of 205° C. to 330° C. at a pressure sufficient to prevent boiling to afford a reaction solution; removing water from the reaction solution; maintaining the reaction solution at a temperature of 205° C. to 330° C. and a pressure sufficient to prevent boiling for 10 minutes to 5 hours to form a product mixture comprising the polyetherimide and solvent; and isolating the polyetherimide.

20 Claims, No Drawings

METHOD OF MAKING POLYETHERIMIDE

CROSS REFERENCE TO RELATED APPLICATIONS

This application is a National Stage application of PCT/US2017/033937, filed May 23, 2017, which claims the benefit of U.S. Provisional Application No. 62/340,831, filed May 24, 2016, both of which are incorporated by reference in their entirety herein.

BACKGROUND

Current methods of making certain polyimides include reacting a bis(anhydride) with a diamine in a solvent, optionally in the presence of a monoamine or monoanhydride. The monoamine and monoanhydride function as a chainstopper. The reaction of certain dianhydrides and diamines can produce an insoluble prepolymer which must be isolated and further reacted to produce a polymer of sufficient molecular weight. Handling the prepolymer and further reacting the prepolymer presents numerous complications and carries significant expense. A more efficient and cost effective method of making a polyimide is needed.

BRIEF DESCRIPTION

A method of making a polyetherimide comprises: combining a bisphenol A dianhydride, p-phenylene diamine and a halogenated aromatic solvent to form a reactant solution; heating the reactant solution to a temperature of 205° C. to 330° C. at a pressure sufficient to prevent boiling to afford a reaction solution; removing water from the reaction solution; maintaining the reaction solution at a temperature of 205° C. to 330° C. and a pressure sufficient to prevent boiling for 10 minutes to 5 hours to form a product mixture comprising the polyetherimide and solvent; and isolating the polyetherimide.

In some embodiments the reactant solution can first be heated to reflux and water removed from the reactant solution prior to being heated to 205° C. to 330° C. at a pressure sufficient to prevent boiling. Using two heating steps results in the formation of a prepolymer in the reactant solution during the first heating step which affords a reaction slurry. The reaction slurry is heated to 205° C. to 330° C. at a pressure sufficient to prevent boiling to afford a reaction solution. The reaction solution is then maintained at a temperature of 205° C. to 330° C. at a pressure sufficient to prevent boiling to afford a product mixture comprising the polyetherimide and solvent. The polyetherimide is then isolated.

In some embodiments the method of making a polyetherimide comprises combining bisphenol A dianhydride and a halogenated aromatic solvent to form a reactant solution; heating the reactant solution to a temperature of 205° C. to 330° C. at a pressure sufficient to prevent boiling, adding p-phenylene diamine to the heated pressurized reactant solution at a temperature of 205° C. to 330° C. and a pressure sufficient to prevent boiling to form a reaction solution; and maintaining the reaction solution at a temperature of 205° C. to 330° C. and a pressure sufficient to prevent boiling to afford a product mixture comprising the polyetherimide and solvent. The polyetherimide is then isolated.

The above described and other features are exemplified by the following figures and detailed description.

DETAILED DESCRIPTION

Current polyetherimide synthetic methods can experience several drawbacks including solubility of the monomers and solubility of the polymer. In some cases the polyetherimide becomes insoluble in the reaction mixture as the molecular weight builds, causing the polyetherimide to precipitate as a prepolymer before the desired molecular weight is attained. In this case, the prepolymer is typically separated from the rest of the reaction mixture and then melt mixed at high temperature to complete imidization and attain the desired molecular weight. It has proven difficult to obtain a consistent melt index and molecular weight in the product polyetherimide over time using this approach despite careful stoichiometric control of the reaction. Surprisingly it has been found that the variations in melt index and molecular weight of the polyetherimide are likely due to variability in the separated prepolymer. Despite rigorous control of the reaction conditions the composition of the separated prepolymer appears to vary sufficiently to result in fluctuations in the melt index and molecular weight of the product polyetherimide over time. It has been discovered that these issues can be addressed by subjecting the reaction mixture to conditions under which the polyetherimide remains soluble until the desired molecular weight is obtained.

As used herein, "reflux" describes a condition in which the solution or mixture is boiling. As used herein, "a pressure sufficient to prevent boiling" describes enough pressure to keep the solution or mixture from boiling at the temperature of the solution or mixture. The maximum pressure applied is 141 psi (972 KPa). The pressure sufficient to prevent boiling can be estimated from the vapor pressure curve of the solvent.

As used herein, the term "prepolymer" describes a polyetherimide having a weight average molecular weight less than or equal to 90% of the final weight average molecular weight. A polyetherimide is determined to have achieved the final weight average molecular weight when the polyetherimide is subjected to melt mixing conditions for 2 to 20 minutes at a temperature of 250 to 430° C. and the weight average molecular weight changes by less than or equal to 5%, or, more specifically, less than or equal to 1%. An exemplary prepolymer for a low molecular weight grade of polyetherimide has a weight average molecular weight of 20,000 to 35,000 Daltons, or 25,000 to 35,000, or 25,000 to 30,000 as determined by gel permeation chromatography (GPC) using polystyrene standards. An exemplary prepolymer for a high molecular weight grade of polyetherimide has a weight average molecular weight of 20,000 to 47,000 Daltons, or 25,000 to 47,000, or 30,000 to 40,000 as determined by gel permeation chromatography (GPC) using polystyrene standards.

In some embodiments, the bisphenol A dianhydride, p-phenylene diamine, optional chain stopper and a halogenated aromatic solvent are combined to form a reactant solution. The term "solution" as used herein comprises a solvent and solutes wherein the solution does not contain any solid material visible to the naked eye. The reactant solution can have a solids content of 10 to 60%, or, more specifically, 15 to 40%. Solids content of the reactant solution is defined as the combined weight of the reactants divided by the combined weight of the reactants and the solvent. In this case the reactants are the bisphenol A dianhydride, p-phenylene diamine, and the optional chain stopper. The reactant solution is heated to a temperature of 205° C. to 330° C. at a pressure sufficient to prevent boiling and water is removed from the heated reaction mixture to afford a reaction solution.

The stoichiometry of the heated reaction solution is adjusted if needed to obtain the desired anhydride:amine ratio and the adjusted reaction solution is maintained at 205° C. to 330° C. and a pressure sufficient to prevent boiling for 10 minutes to 5 hours with removal of water to form a product mixture comprising a polyetherimide and solvent. By using an elevated temperature and pressure the prepolymer remains in solution and the reaction solution proceeds directly to producing a polyetherimide with the desired molecular weight. The polyetherimide is isolated from the solvent.

In some embodiments the bisphenol A dianhydride, p-phenylene diamine, optional chain stopper and a halogenated aromatic solvent are combined to form a reactant solution. The reactant solution is heated to reflux with removal of water. A prepolymer forms and affords a reaction slurry. The reaction slurry can have a solids content of 10 to 60%, or, more specifically, 15 to 40%. The solids content of the reaction slurry is defined as the combined weight of prepolymer, bisphenol A dianhydride, aromatic diamine, and optional chain stopper divided by the combined weight of solvent, prepolymer, bisphenol A dianhydride, aromatic diamine, and optional chain stopper. The stoichiometry of the slurry is adjusted if needed to achieve the desired anhydride:amine ratio. The reaction slurry is then heated to 205° C. to 330° C. at a pressure sufficient to prevent boiling to afford a reaction solution and maintained at these conditions for 10 minutes to 5 hours with removal of water to afford a product mixture. Under these conditions the prepolymer goes into solution and imidization proceeds to form a polyetherimide of the desired molecular weight. The polyetherimide is isolated from the solvent.

In some embodiments the bisphenol A dianhydride is combined with the halogenated aromatic solvent to form a reactant solution. The reactant solution is heated to 205 to 330° C. at a pressure sufficient to prevent boiling. The p-phenylene diamine is heated to 205 to 330° and added to the heated, pressurized reactant solution to afford a reaction solution. The p-phenylene diamine can be added from below the surface of the reactant solution or from above the surface of the reactant solution. The optional chain stopper is added with the dianhydride, the diamine, or both. The stoichiometry of the heated, pressurized reaction solution is adjusted if needed to obtain the desired anhydride:amine ratio and the adjusted reaction solution is maintained at 205° C. to 330° C. and a pressure sufficient to prevent boiling for 10 minutes to 5 hours with removal of water to form a product mixture comprising a polyetherimide and solvent. Delaying the addition of the diamine until after the reactant solution is at 205° C. to 330° C. and a pressure sufficient to prevent boiling means that the prepolymer remains in solution throughout the formation of the polyetherimide. The polyetherimide is isolated from the solvent.

It is also contemplated that the diamine and solvent can be combined with the halogenated aromatic solvent to form a reactant solution. The reactant solution is heated to 205 to 330° C. at a pressure sufficient to prevent boiling. The bisphenol A dianhydride is heated to 205 to 330° and added to the heated, pressurized reactant solution to afford a reaction solution. The bisphenol A dianhydride can be added from below the surface of the reactant solution or from above the surface of the reactant solution. The optional chain stopper is added with the dianhydride, the diamine, or both. The stoichiometry of the heated, pressurized reaction solution is adjusted if needed to obtain the desired anhydride:amine ratio and the adjusted reaction solution is maintained at 205° C. to 330° C. and a pressure sufficient to prevent boiling for 10 minutes to 5 hours with removal of water to form a product mixture comprising a polyetherimide and solvent. Delaying the addition of the bisphenol A dianhydride until after the reactant solution is at 205° C. to 330° C. and a pressure sufficient to prevent boiling means that the prepolymer remains in solution throughout the formation of the polyetherimide. The polyetherimide is separated from the solvent.

The polyetherimide can be isolated from the solvent by filtration, centrifugation, flashing the solution to a vacuum dryer, sending the solution to a thermo-mechanical separation device such as a devolatizing extruder or a vertical or horizontal agitated thin film evaporator, or a combination comprising at least one of the foregoing. In some embodiments, the product mixture can be cooled to precipitate the polymer, and the solvent can be removed by filtration, centrifugation, or combination comprising at least one of the foregoing. In some embodiments at least a portion of the solvent is removed using a thin film evaporator. A thin film evaporator can be operated under a pressure of 21 to 140 psig (144 to 966 KPa) to avoid precipitation of the polyetherimide in the evaporator.

The anhydride:amine ratio is chosen based on whether an excess of amine groups or anhydride groups is desired. The ratio can be 1:1 or have an excess of up to 50 mol % of amine or anhydride.

As discussed above the temperature can be 205 to 330° C. Within this range the temperature can be 205 to 280° C., or, 220 to 260° C., or 230 to 260° C.

Halogenated aromatic solvents include chloro benzene, dichlorobenzene (particularly ortho dichlorobenzene), trichlorobenzene, and bromobenzene. Combinations of these halogenated aromatic solvents may also be used.

Chain stoppers include mono-amines, mono-anhydrides, or combinations of mono-amines and mono-anhydrides. The amount of monoamine, mono-anhydride or mixture thereof, may be any amount that provides the desired molecular weight of the polyimide. In some embodiments the amount of mono-amine, mono-anhydride, or combination comprising at least one of the foregoing may be about 0.1 to about 15.0 mole %, or 0.1 to 7.0 mole %, based on the total monomer content.

Mono-amines that can be used may have from about 3 to about 24 carbon atoms, may be aliphatic or aromatic, and may include, but are not limited to, substituted or unsubstituted anilines, substituted or unsubstituted naphthyl amines, and substituted or unsubstituted heteroaryl amines. The mono-amines may have additional functionality, for instance, aryl groups, alkyl groups, aryl-alky groups, sulfone groups, ester groups, amide groups, halogens, alkyl or aryl halogen groups, alkyl ether groups, aryl ether groups, or aryl keto groups. Some particular substituents on mono-amines include, but are not limited to, halo and perfluoroalkyl. The attached functionality should not impede the function of the mono-amine in controlling polyimide molecular weight.

Mono-anhydrides may also have about 3 to about 24 carbon atoms, may be aliphatic or aromatic, and include, but are not limited to, substituted or unsubstituted phthalic anhydrides for instance, phthalic anhydride, chloro phthalic anhydride, methoxy phthalic anhydride, phenoxy phthalic anhydride, naphthyl anhydrides and the like. End capping agents may also be chosen from the group consisting of 1,2-dicarboxylic acids, 1,2-dicarboxylic esters, 1,2-dicarboxylic ester acids and mixtures comprising one or more of the foregoing.

In some embodiments the chain stopper comprises phthalic anhydride, aniline or a combination comprising at least one of the foregoing.

Branching agents may also be employed in the reaction to prepare branched polyetherimides. Exemplary branching agents include, for example, tri or tetra functional amines or anhydrides.

Polyetherimides comprise more than 1, for example 10 to 1000, or 10 to 500, or 10 to 50 structural units of formula (1)

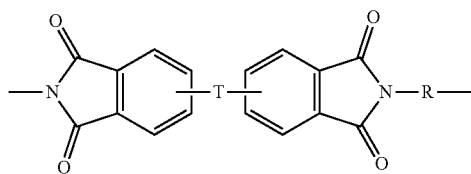

(1)

wherein each R is derived from p-phenylene diamine and T is derived from bisphenol A. The finished polyetherimide (not the prepolymer) may have a weight average molecular weight of 30,000 to 200,000, 33,000 to 100,000, or 35,000 to 58,000 Daltons as determined by GPC using polystyrene standards as further described in the Examples. The finished polyetherimide has a weight average molecular weight greater than the weight average molecular weight of the prepolymer.

The invention is further demonstrated by the following non-limiting examples.

EXAMPLES

Example 1

In a commercial scale process bisphenol A dianhydride, p-phenylene diamine, and aniline were combined with ortho-dichlorobenzene (ODCB) and reacted at a temperature of 120° C. to 180° C. and a pressure of 0 to 2 psig with the removal of water. The slurry was cooled to less than 60° C. and the solid prepolymer was removed by centrifugation to afford a wet cake. The prepolymer sample (202 grams, g) wet-cake having a solids content of 51.2 weight percent, based on the total weight of the wet-cake, and 248 g of reagent grade ODCB was charged to a 600 milliliter (ml) glass liner for a Parr pressure reactor. The liner was placed in the Parr reactor. The Parr reactor had two opposed quartz windows. The reactor was sealed and purged with nitrogen. The Parr reactor was heated to 230° C. at 30 psig (207 KPa) with the use of an electrical heater. The material was mechanically stirred and was not fully dissolved at 230° C. The vent to the reactor was opened to release any water that was present. The vessel was resealed and heated to 240° C. and 45 psig (310 KPa) with mechanical stirring. At this temperature and pressure the material completely dissolved to afford a reaction solution. The solution was stirred for 3 hours at 240° C. and 45 psig (310 KPa). The Parr was then cooled to room temperature, where upon the polymer precipitated from solution. The reactor was vented and the polymer was collected by filtration.

Molecular weight (weight average molecular weight (Mw) and number average molecular weight (Mn)) was analyzed by gel permeation chromatography (GPC) using a Polymer Labs Mixed Bed C 300 by 7.5 millimeter (mm) column, P/N 1110-6500, at 30° C. using methylene chloride as eluent, 254 nanometer (nm) detection, and polystyrene standards to calibrate the method. Polydispersity index (PDI) was calculated from the Mw and Mn.

For comparison, the prepolymer was melt mixed at 360° C. and 50 rotations per minute (rpm) for 15 minutes, under argon. The products after melt mixing were also analyzed by GPC as described above. The polymer resulting from the prepolymer wet-cake and obtained by the commercial process was also analyzed by GPC also as described above. The commercial process includes drying the wet cake and finishing polymerization and isolation of the dried material in an extruder. The data is shown in Table 1.

TABLE 1

|  | Prepolymer | After Parr | Prepolymer after melt mixing | Commercial product |
| --- | --- | --- | --- | --- |
| Mw | 33551 | 39891 | 38376 | 40870 |
| Mn | 14493 | 16089 | 15921 | 19290 |
| PDI | 2.31 | 2.48 | 2.41 | 2.12 |

As can be seen from the data in Table 1, the Mw of the material resulting from the Parr is very similar to the material that results from the melt mixing the prepolymer. Additionally, the Mw of the commercial product that resulted from the devolatilization of the same prepolymer used in the lab study is very similar to the material after treatment in the Parr at 240° C., 45 psig. This data confirms that polymerization at a higher pressure is a viable route to the finished polymer.

Example 2

To further examine the utility of the solution polymerization process, bulk samples were taken from each stage of the commercial process described in Example 1 and analyzed for Mw, PDI, and % solids. Additionally, the samples were also used as starting materials for several processes: in solution polymerization, melt mixing, and solution polymerization followed by melt mixing to determine the impact of these processing techniques on the final polymer molecular weight and PDI.

Four samples were collected from the commercial process. Sample 1 was a prepolymer slurry, sample 2 was the centrifuged wet-cake, sample 3 was dried prepolymer powder collected from inside the dryer (the wet cake is dried prior to entering the extruder), and sample 4 was final polymer pellets collected from the extruder. Table 2 contains the Mw and PDI data for these samples.

TABLE 2

|  | Mw | Mn | PDI | % Solids |
| --- | --- | --- | --- | --- |
| Sample 1 (Slurry) | 31,050 | 13,926 | 2.23 | 19 |
| Sample 2 (Wet-cake) | 31,936 | 15,207 | 2.10 | 47 |
| Sample 3 (Dry Powder) | 34,187 | 15,991 | 2.14 | 95 |
| Sample 4 (Pellets) | 39,676 | 18,922 | 2.10 | 100 |

For comparison, 50 grams, on a dry solids basis, of samples 1, 2, and 3 were melt mixed at 360° C. and 50 rpm, under argon, and sampled at 10, 15, and 20 minutes. Table 3 below contains the results of these experiments.

TABLE 3

| Sample Name | Mw | Mn | PDI |
| --- | --- | --- | --- |
| Sample 1a (Slurry, 10 min) | 40,179 | 19,119 | 2.10 |
| Sample 1b (Slurry, 15 min) | 40,762 | 19,462 | 2.09 |
| Sample 1c (Slurry, 20 min) | 41,011 | 19,321 | 2.12 |
| Sample 2a (Wet Cake, 10 min) | 40,392 | 19,633 | 2.06 |
| Sample 2b (Wet Cake, 15 min) | 41,245 | 19,994 | 2.06 |
| Sample 2c (Wet Cake, 20 min) | 41,047 | 19,862 | 2.07 |
| Sample 3a (Dry Powder, 10 min) | 40,424 | 18,846 | 2.14 |
| Sample 3b (Dry Powder, 15 min) | 40,958 | 19,051 | 2.15 |
| Sample 3c (Dry Powder, 20 min) | 41,145 | 18,875 | 2.18 |

The data in Table 3 shows that it is possible to complete the polymerization by melt mixing using any of Samples 1-3 and the resulting polymer has similar weight average molecular weight, number average molecular weight and PDI to the commercial product.

Approximately 375 grams of Sample 1 (19% solids slurry) was charged to a Parr reactor which was then sealed and purged with nitrogen. The Parr reactor was heated to 240° C. at 40 psig (276 KPa) with the use of an electrical heater at which point the prepolymer slurry transitioned from cloudy to clear indicating it had gone into solution. The solution was stirred for 3 hours at 240° C. and 40 psig (276 KPa). During the reaction water and ODCB were allowed to escape through the back pressure vent and ODCB was condensed and collected using an ice water condenser. After the three hours the reaction was complete. The nitrogen sweep rate was increased and ODCB was taken overhead and collected in the condenser. The sweep continued until the solution within the Parr was approximately 40% solids and this took approximately 30 minutes to complete. The Parr was then depressurized, where upon the polymer transitioned from a solution into a wet cake. As used herein the term "wet-cake" describes a mixture of precipitated polymer and solvent where the cake does not have sufficient solvent to result in a free flowing slurry. This wet cake was removed and gently crushed into a powder using a spatula. Percent solids analysis of this powder confirmed that it was 39% solids. This powder material was then analyzed for Mw and PDI both before and after melt mixing to confirm that the powder material was fully polymerized. The results of this testing are shown in Table 4 below.

TABLE 4

| | Mw | Mn | PDI |
| --- | --- | --- | --- |
| Parr Powder | 40,110 | 18,584 | 2.16 |
| Parr Powder, 10 min melt mixing | 40,596 | 18,575 | 2.19 |
| Parr Powder, 15 min melt mixing | 40,872 | 19,110 | 2.14 |
| Parr Powder, 20 min melt mixing | 41,029 | 19,169 | 2.14 |

The data in Table 4 show that reacting the prepolymer slurry under increased temperature and pressure offers a direct solution polymerization route to the finished polyetherimide. The material obtained after reaction at increased temperature and pressure (the Parr powder) had a weight average molecular weight, number average molecular weight and PDI very similar to materials that were further subjected to melt isolation, indicating that the material obtained from solution polymerization was a finished polymer.

Examples 3 and 4

An 8 gal (30.24 liter) reactor vessel rated for 140 psig and 245° C. with an overhead condenser system was charged with the required initial amount of ODCB. A pre-weighed amount of powdered bisphenol A dianhydride (BPADA) and phthalic anhydride was added to the reactor vessel from powder addition port at the top. The mixture was then heated to 240° C. at 40 psig pressure. The required amount of p-phenylene diamine (pPD) was charged in a separate vessel and heated to 180° C. to ensure all material was molten. The molten p-phenylene diamine was charged over a period of 15 minutes sub-surface from the bottom of the reactor. The p-phenylene diamine charge tank was flushed with additional 1 kg ODCB to transfer all contents to the reactor. The overhead system was used to condense ODCB and water vapors formed as a result of the reaction and total weight in the reactor was maintained by adding additional ODCB to maintain a certain % solids. The stoichiometry of the heated reaction solution was adjusted to obtain the desired anhydride: amine ratio. The contents of the reactor were emptied after 4.5 hours and the polymer was characterized using a GPC (described in earlier example). The amounts of reactants as well as the weight average molecular weight (Mw) of the polyetherimide, the number average molecular weight (Mn) and the PDI are shown in Table 5. Kilograms are abbreviated as kg and grams are abbreviated as g.

TABLE 5

| | BPADA (kg) | pPD (kg) | PA (g) | Initial ODCB (kg) | % solids | Mw | Mn | PDI |
| --- | --- | --- | --- | --- | --- | --- | --- | --- |
| 3 | 3.5 | 0.727 | 30.96 | 9.4 | 30% | 54423 | 25652 | 2.12 |
| 4 | 3.25 | 0.6844 | 48.75 | 5.6 | 40% | 43869 | 20971 | 2.09 |

The data in Table 6 shows that the addition of the diamine in molten form to a reactant solution comprising halogenated solvent and bisphenol A dianhydride is an effective way to form a polyetherimide in solution. This method yields a polyetherimide with a relatively low PDI.

Example 5

A slurry sample used to make a high molecular weight grade was added to a 250 gallon (945 liters) pressure vessel and heated to 180° C. to remove excess solvent and achieve the desired starting concentration of 30% solids. After the concentration step, the slurry was further heated to 235° C. and maintained at a pressure of 40 psig (276 KPa) for 2 hours. At 235° C. and 40 psig, the slurry became a solution. The vent on the pressure vessel was opened intermittently to release 1 to 2 psig of pressure to remove any water formed in the reactor. After approximately 90 minutes at 235° C. the reaction solution was fed to an agitated thin film evaporator having 0.5 square meter surface area. The agitated thin film evaporator was maintained under pressure and had a rotor speed as shown in Table 7. The exit rate of the material from the agitated thin film evaporator is shown in Table 7 as well as the solids content of the slurry, the solids content of the solution and the solids content of samples 5A-5D upon exiting the agitated thin film evaporator. The motor hydraulic pressure varied from 975 to 2000 psig. The oil jacket on the wiped film evaporator was maintained at a temperature of 290 to 326° C. The resulting polyetherimide was analyzed by GPC as described above. The melt temperature of the polyetherimide exiting the agitated thin film evaporator was noted and is shown in Table 6.

TABLE 6

|  | Mw | PDI | Solids content | Exit rate Lb/hour | Rotor rpm | Pressure psig | Melt Temp. ° C. |
|---|---|---|---|---|---|---|---|
| Slurry | 46330 | 2.42 | 15.8% |  |  |  |  |
| Solution | 51295 | 2.26 | 29.5% |  |  |  |  |
| 5A | 52418 | 2.30 | 98.3% | 33.6 | 120 | 35 | 318.7 |
| 5B | 49500 | 2.26 | 92.2% | 70 | 117 | 35 | 314.7 |
| 5C | 50713 | 2.29 | 95.5% | 53 | 125 | 30 | 308.8 |
| 5D | 52247 | 2.34 | 96.0% | 57 | 180 | 26 | 318.4 |
| 5E |  | ** |  | 57 | 160 | 20 | 322 |

** Unstable conditions - polymer went overhead

Samples 5A through 5D show that an agitated thin film extruder is an effective way to isolate the polyetherimide produced in solution. While the product mixture (solution) entering the agitated thin film evaporator had a solids content of 29.5%, samples 5A-5D had a solids content greater than 90%—showing an effective removal of the solvent. The fact that samples 5A-5D had similar molecular weights indicates that the polyetherimide in the product mixture (solution) was fully polymerized.

In samples 5A and 5B the pressure of the agitated thin film evaporator was not varied while the exit rate was varied. The higher exit rate led to a material having more residual solvent. In samples 5C to 5E there was little variation in the exit rate while the pressure was varied. Notably, the pressure of the agitated thin film evaporator needs to be greater than 20 psig in order to have stable operating conditions.

Example 6

Similar to Example 5, a slurry sample used to make a high molecular weight grade was added to a 250 gallon (945 liters) pressure vessel and heated to 180° C. to remove excess solvent and achieve the desired starting concentration of 30% solids. After the concentration step, the slurry was further heated to 235° C. and maintained at a pressure of 40 psig (276 KPa) for 2 hours. At 235° C. and 40 psig, the slurry became a solution. The vent on the pressure vessel was opened intermittently to release 1 to 2 psig of pressure to remove any water formed in the reactor. After approximately 90 minutes at 235° C. the reaction solution was fed to an agitated thin film evaporator having 0.5 square meter surface area. The agitated thin film evaporator was maintained under pressure and had a rotor speed as shown in Table 7. The exit rate of the material from the agitated thin film evaporator is shown in Table 7 as well as the solids content of the slurry, the solids content of the solution and the solids content of samples 6A-6E upon exiting the agitated thin film evaporator. The motor hydraulic pressure varied from 675 to 900 psig. The oil jacket on the agitated thin film evaporator was maintained at a temperature of 295 to 325° C. The resulting polyetherimide was analyzed by GPC as described above.

TABLE 7

|  | Mw | PDI | Solids content | Exit rate Lb/hour | Rotor rpm | Pressure psig | Melt Temp ° C. |
|---|---|---|---|---|---|---|---|
| Slurry | 41145 | 2.68 | 21.5% |  |  |  |  |
| Solution | 51730 | 2.48 | 27.4% |  |  |  |  |
| 6A | 51771 | 2.51 | 98.8% | 29 | 120 | 45 | 319.6 |
| 6B | 51865 | 2.55 | 88.4% | 51 | 145 | 45 | 321.1 |
| 6C | 52013 | 2.45 | 92.5% | 62 | 165 | 45 | 322.5 |
| 6D | 51951 | 2.54 | 94.5% | 80 | 185 | 45 | 283.1 |
| 6E | 51970 | 2.49 | 95.9% | 70 | 185 | 45 | 312 |

In samples 6A through 6E the exit rate of the polyetherimide was varied. This polyetherimide was further processed in a devolatizing extruder to remove additional solvent.

COMPARATIVE EXAMPLES

Other combinations of dianhydrides and diamines were combined in ODCB and reacted under conditions similar to those described above (temperatures of 220 to 300° C. and pressures of 20 to 140 psig (137 to 966 KPa). None of the dianhydride/diamine combinations described below formed a reaction solution.

TABLE 8

| Comparative Example | Dianhydride | Diamine |
|---|---|---|
| A | Bisphenol A dianhydride (1 molar equivalent) and pyromellitic dianhydride (1 molar equivalent) | m-phenylene diamine |
| B | Oxydiphthalic dianhydride | Diamino diphenyl sulfone |
| C | 3,3'-biphenol dianhydride dianhydride | m-phenylene diamine |
| D | 4,4'-Biphenol Dianhydride | Diamino diphenyl sulfone |

These comparative results demonstrate that elevated temperature and pressure are not always sufficient to cause a polyetherimide prepolymer to remain in solution in the reaction solution and in fact, demonstrate that it is more likely that the prepolymer will not remain in solution, even at elevated temperatures and pressures.

The invention is further illustrated by the following Embodiments.

Embodiment 1

A method of making a polyetherimide comprising: combining a bisphenol A dianhydride, p-phenylene diamine and a halogenated aromatic solvent to form a reactant solution; heating the reactant solution to a temperature of 205° C. to 330° C. at a pressure sufficient to prevent boiling to afford a reaction solution; removing water from the reaction solution; maintaining the reaction solution at a temperature of 205° C. to 330° C. and a pressure sufficient to prevent boiling for 10 minutes to 5 hours to form a product mixture comprising the polyetherimide and solvent; and isolating the polyetherimide.

Embodiment 2

A method of making a polyetherimide comprising: combining bisphenol A dianhydride and a halogenated aromatic solvent to form a reactant solution; heating the reactant solution to a temperature of 205° C. to 330° C. at a pressure sufficient to prevent boiling; adding p-phenylene diamine to the heated pressurized reactant solution at a temperature of 205° C. to 330° C. and a pressure sufficient to prevent boiling to form a reaction solution; maintaining the reaction solution at a temperature of 205° C. to 330° C. and a pressure sufficient to prevent boiling to afford a product mixture comprising the polyetherimide and solvent; and isolating the polyetherimide.

Embodiment 3

The method of Embodiment 1 or 2, wherein the reactant solution has a solids content of 10 to 60%.

Embodiment 4

The method of Embodiment 3, wherein the reactant solution has a solids content of 15 to 40%.

Embodiment 5

The method of any one of Embodiments 1 to 4, wherein the reactant solution is heated to a temperature of 220 to 260° C. and the reaction solution is maintained at a temperature of 220 to 260° C.

Embodiment 6

The method of Embodiment 2, wherein the p-phenylene diamine is added from below the surface of the reactant solution.

Embodiment 7

The method of any one of Embodiments 1 to 6, further comprising combining a chain stopper with the bisphenol A dianhydride, p-phenylene diamine and a halogenated aromatic solvent.

Embodiment 8

The method of Embodiment 7, wherein the chain stopper comprises phthalic anhydride, aniline or a combination comprising at least one of the foregoing.

Embodiment 9

The method of any one of Embodiments 1 to 8, wherein the halogenated solvent comprises ortho dichlorobenzene.

Embodiment 10

A method of making a polyetherimide comprising: combining a bisphenol A dianhydride, p-phenylene diamine and a halogenated aromatic solvent to form a reactant solution; heating the reactant solution to reflux and removing water to afford a reaction slurry; heating the reaction slurry to a temperature of 205° C. to 330° C. at a pressure to afford a reaction solution; removing water from the reaction solution; maintaining the reaction solution at a temperature of 205° C. to 330° C. and a pressure sufficient to prevent boiling for 10 minute to 5 hours to form a product mixture comprising the polyetherimide and solvent; and isolating the polyetherimide.

Embodiment 11

The method of Embodiment 10, wherein the reactant solution has a solids content of 10 to 60%.

Embodiment 12

The method of Embodiment 10 or 11, wherein the reactant slurry is heated to a temperature of 220 to 260° C. and the reaction slurry is maintained at a temperature of 220 to 260° C.

Embodiment 13

The method of any one of Embodiments 10 to 12, further comprising combining a chain stopper with the bisphenol A dianhydride, p-phenylene diamine and a halogenated aromatic solvent.

Embodiment 14

The method of Embodiment 13, wherein the chain stopper comprises phthalic anhydride, aniline or a combination comprising at least one of the foregoing.

Embodiment 15

The method any one of Embodiments 10 to 14, wherein the halogenated solvent comprises ortho dichlorobenzene.

Embodiment 16

The method of any of the preceding Embodiments wherein the polyetherimide has a weight average molecular weight of 30,000 to 200,000 Daltons as determined by gel permeation chromatography using polystyrene standards.

Embodiment 17

The method of any one of the preceding Embodiments wherein the product mixture is cooled to precipitate the polyetherimide, and the polyetherimide is isolated by filtration, centrifugation or a combination comprising at least one of the foregoing Embodiment 18

The method of any of the preceding Embodiments wherein the polyetherimide is isolated using a devolatizing extruder.

Embodiment 19

The method of any of the preceding Embodiments wherein the polyetherimide is isolated using an agitated thin film evaporator.

Embodiment 20

The method of Embodiment 19, wherein the wiped film evaporator is operated at a pressure of 21 to 140 psig.

In general, the methods can alternatively comprise, consist of, or consist essentially of, any appropriate components or steps herein disclosed. The methods may additionally, or alternatively, be devoid, or substantially free, of any components or steps not necessary to the achievement of the function and/or objectives of the claims.

All ranges disclosed herein are inclusive of the endpoints, and the endpoints are independently combinable with each other (e.g., ranges of "up to 25 wt. %, or, more specifically, 5 wt. % to 20 wt. %," is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or" unless clearly indicated to the contrary by context. Reference throughout the specification to "some embodiments", "another embodiment", "an embodiment," and so forth, means that a particular element (e.g., feature, structure, or characteristic) described in connection with the embodiment is included in at least one embodiment described herein, and may or may not be present in other embodiments. In addition, it is to be understood that the described elements may be combined in any suitable manner in the various embodiments.

All references cited herein are incorporated by reference in their entirety. While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents. As used herein, the term "hydrocarbyl" includes groups containing carbon, hydrogen, and optionally one or more heteroatoms (e.g., 1, 2, 3, or 4 atoms such as halogen, O, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene ($-CH_2-$) or propylene ($-(CH_2)_3-$)). "Alkenyl" and "alkenylene" mean a monovalent or divalent, respectively, straight or branched chain hydrocarbon group having at least one carbon-carbon double bond (e.g., ethenyl ($-HC=CH_2$) or propenylene ($-HC(CH_3)=CH_2-$). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula $-C_nH_{2-x}$, and $-C_nH_{2n-2x}-$ wherein x is the number of cyclization(s). "Aryl" means a monovalent, monocyclic or polycyclic aromatic group (e.g., phenyl or naphthyl). "Arylene" means a divalent, monocyclic or polycyclic aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P).

"Substituted" means that the compound or group is substituted with at least one (e.g., 1, 2, 3, or 4) substituents instead of hydrogen, where each substituent is independently nitro ($-NO_2$), cyano ($-CN$), hydroxy ($-OH$), halogen, thiol ($-SH$), thiocyano ($-SCN$), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkylene (e.g, benzyl), $C_{7-12}$ alkylarylene (e.g, toluyl), $C_{4-12}$ heterocycloalkyl, $C_{3-12}$ heteroaryl, $C_{1-6}$ alkyl sulfonyl ($-S(=O)_2$-alkyl), $C_{6-12}$ arylsulfonyl ($-S(=O)_2$-aryl), or tosyl ($CH_3C_6H_4SO_2-$), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituent(s).

The invention claimed is:

1. A method of making a polyetherimide comprising:
    combining a bisphenol A dianhydride, p-phenylene diamine and a halogenated aromatic solvent to form a reactant solution;
    heating the reactant solution to a temperature of 205° C. to 330° C. at a pressure sufficient to prevent boiling to afford a reaction solution;
    removing water from the reaction solution;
    maintaining the reaction solution at a temperature of 205° C. to 330° C. and a pressure sufficient to prevent boiling for 10 minutes to 5 hours to form a product mixture comprising the polyetherimide and solvent; and
    isolating the polyetherimide.

2. A method of making a polyetherimide comprising:
    combining bisphenol A dianhydride and a halogenated aromatic solvent to form a reactant solution;
    heating the reactant solution to a temperature of 205° C. to 330° C. at a pressure sufficient to prevent boiling,
    adding p-phenylene diamine to the heated pressurized reactant solution at a temperature of 205° C. to 330° C. and a pressure sufficient to prevent boiling to form a reaction solution;
    maintaining the reaction solution at a temperature of 205° C. to 330° C. and a pressure sufficient to prevent boiling to afford a product mixture comprising the polyetherimide and solvent; and
    isolating the polyetherimide.

3. The method of claim 1, wherein the reactant solution has a solids content of 10 to 60%.

4. The method of claim 2, wherein the p-phenylene diamine is added from below the surface of the reactant solution.

5. The method of claim 1, further comprising combining a chain stopper with the bisphenol A dianhydride, p-phenylene diamine and a halogenated aromatic solvent.

6. A method of making a polyetherimide comprising:
    combining a bisphenol A dianhydride, p-phenylene diamine and a halogenated aromatic solvent to form a reactant solution;
    heating the reactant solution to reflux and removing water to afford a reaction slurry;
    heating the reaction slurry to a temperature of 205° C. to 330° C. at a pressure to afford a reaction solution;
    removing water from the reaction solution;
    maintaining the reaction solution at a temperature of 205° C. to 330° C. and a pressure sufficient to prevent boiling for 10 minutes to 5 hours to form a product mixture comprising the polyetherimide and solvent; and
    isolating the polyetherimide.

7. The method of claim 6, wherein the reactant solution has a solids content of 10 to 60%.

8. The method of claim 6, wherein the reactant slurry is heated to a temperature of 220 to 260° C. and the reaction slurry is maintained at a temperature of 220 to 260° C.

9. The method of claim 6, further comprising combining a chain stopper with the bisphenol A dianhydride, p-phenylene diamine and a halogenated aromatic solvent.

10. The method of claim 1, wherein the product mixture is cooled to precipitate the polyetherimide, and the polyetherimide is isolated by filtration, centrifugation or a combination comprising at least one of the foregoing.

11. The method of claim 1, wherein the polyetherimide is isolated using a devolatizing extruder.

12. The method of claim 1, wherein the polyetherimide is isolated using an agitated thin film evaporator.

13. The method of claim 2, wherein the reactant solution has a solids content of 10 to 60%.

14. The method of claim 2, further comprising combining a chain stopper with the bisphenol A dianhydride, p-phenylene diamine and a halogenated aromatic solvent.

15. The method of claim 2, wherein the product mixture is cooled to precipitate the polyetherimide, and the polyetherimide is isolated by filtration, centrifugation or a combination comprising at least one of the foregoing.

16. The method of claim 2, wherein the polyetherimide is isolated using a devolatizing extruder.

17. The method of claim 2, wherein the polyetherimide is isolated using an agitated thin film evaporator.

18. The method of claim 6, wherein the product mixture is cooled to precipitate the polyetherimide, and the polyetherimide is isolated by filtration, centrifugation or a combination comprising at least one of the foregoing.

19. The method of claim 6, wherein the polyetherimide is isolated using a devolatizing extruder.

20. The method of claim 6, wherein the polyetherimide is isolated using an agitated thin film evaporator.

* * * * *